US012676678B2

(12) United States Patent
Yang et al.

(10) Patent No.: US 12,676,678 B2
(45) Date of Patent: Jul. 7, 2026

(54) OPTICAL SIGNAL RECEIVING APPARATUS, SYSTEM AND METHOD, OPTICAL LINE TERMINAL, AND COMPUTER-READABLE STORAGE MEDIUM

(71) Applicant: ZTE CORPORATION, Shenzhen (CN)

(72) Inventors: Bo Yang, Shenzhen (CN); Xingang Huang, Shenzhen (CN); Xingyu Lei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 274 days.

(21) Appl. No.: 18/571,403

(22) PCT Filed: Jun. 16, 2022

(86) PCT No.: PCT/CN2022/099094
§ 371 (c)(1),
(2) Date: Dec. 18, 2023

(87) PCT Pub. No.: WO2022/262799
PCT Pub. Date: Dec. 22, 2022

(65) Prior Publication Data
US 2024/0291569 A1 Aug. 29, 2024

(30) Foreign Application Priority Data
Jun. 18, 2021 (CN) .......................... 202110677204.9

(51) Int. Cl.
*H04B 10/50* (2013.01)
*H01S 3/067* (2006.01)

(52) U.S. Cl.
CPC ....... *H04B 10/503* (2013.01); *H01S 3/06754* (2013.01)

(58) Field of Classification Search
CPC ........... H01S 3/067; H04B 10/50; H04B 1/02; H04B 1/06; H04B 1/62; H04B 1/69;
(Continued)

(56) References Cited

U.S. PATENT DOCUMENTS 5,963,361 A * 10/1999 Taylor ................. H01S 3/06758
398/1
6,049,413 A * 4/2000 Taylor ................... H01S 3/1301
398/1
(Continued)

FOREIGN PATENT DOCUMENTS

CN 1901411 A 1/2007
CN 101611603 A 12/2009
(Continued)

OTHER PUBLICATIONS

Hyun-Seung Kim et al. , "Simultaneous Wired and Wireless 1.25-GB/s Bidirectional WDM-RoF Transmission Using Multiple Optical Carrier Suppression in FP LD," Jul. 17, 2009, Journal of Lightwave Technology, vol. 27, No. 14, Jul. 15, 2009, pp. 2744-2749.*
(Continued)

*Primary Examiner* — Omar S Ismail
(74) *Attorney, Agent, or Firm* — Li & Cai Intellectual Property (USA) Office

(57) ABSTRACT
The present disclosure discloses an optical signal receiving apparatus, an optical line terminal, an optical signal receiving system, an optical signal receiving method, and a computer-readable storage medium. The optical signal receiving apparatus is configured to receive optical signals at multiple speeds, and includes: a filter and at least one detector; the filter is disposed following an amplifier, filter characteristics of the filter are configured according to a preset wavelength range, and the filter is configured to filter out noise in optical signals amplified by the amplifier and
(Continued)

perform wavelength division processing on the optical signals to obtain at least one optical signal corresponding to the preset wavelength range; and the at least one detector is configured to convert the at least one optical signal into an electrical signal.

15 Claims, 5 Drawing Sheets

(58) Field of Classification Search
CPC ...... H04B 1/3816; H04B 1/3827; H04B 1/40;
H04B 1/03; H04B 1/10; H04B 1/16;
H04B 1/38; H04B 1/403; H04B 1/44;
H04B 1/50; H04B 1/54; H04B 1/707;
H04B 1/713; H04B 1/7163; H04B 3/02;
H04B 3/54; H04B 5/00; H04B 5/20;
H04B 5/40; H04B 5/70; H04B 7/02;
H04B 7/14; H04B 7/24; H04B 10/60;
H04B 10/40; H04B 10/25; H04B 10/80;
H04B 17/20; H04B 17/10; H04B 17/30;
H04B 15/02; H04B 14/02
See application file for complete search history.

(56) References Cited

U.S. PATENT DOCUMENTS

| | | | | |
|---|---|---|---|---|
| 6,646,791 | B2 * | 11/2003 | Sugaya | H04J 14/0221 359/341.41 |
| 6,900,931 | B1 * | 5/2005 | Sridhar | H01S 3/06754 359/337.1 |
| 8,494,372 | B2 * | 7/2013 | Eiselt | H04B 10/675 398/140 |
| 9,143,236 | B1 * | 9/2015 | Bartur | G01M 11/3145 |
| 9,350,479 | B2 * | 5/2016 | Sone | H04J 14/0212 |
| 12,063,611 | B2 * | 8/2024 | Sijanec | H04L 12/2898 |
| 2004/0033076 | A1 * | 2/2004 | Song | H04J 14/028 398/70 |
| 2005/0157976 | A1 * | 7/2005 | Furukawa | H04B 10/296 398/79 |
| 2010/0135672 | A1 * | 6/2010 | Takahashi | H04B 10/672 398/202 |
| 2012/0121259 | A1 * | 5/2012 | Kuwata | H04B 10/673 398/38 |
| 2013/0251368 | A1 * | 9/2013 | Kim | H04B 10/572 398/58 |
| 2016/0149645 | A1 * | 5/2016 | Liu | H04B 10/116 398/135 |
| 2018/0123724 | A1 * | 5/2018 | Zhang | H04J 14/0271 |
| 2018/0145760 | A1 * | 5/2018 | Kowalevicz | H04B 10/50572 |
| 2019/0379453 | A1 * | 12/2019 | Toda | H04J 14/0221 |
| 2020/0177238 | A1 * | 6/2020 | Barzegar | H04B 3/56 |

FOREIGN PATENT DOCUMENTS

| | | | |
|---|---|---|---|
| CN | 101854212 | A | 10/2010 |
| EP | 2088696 | A1 | 8/2009 |
| JP | 2016009897 | A | 1/2016 |
| WO | WO-2012149913 | A1 * | 11/2012 ......... H04B 10/0799 |

OTHER PUBLICATIONS

Yu Xiang et al., "Wired/wireless access integrated RoF-PON with scalable generation of multi-frequency MMWs enabled by polarization multiplexed FWM in SOA," Jan. 11, 2013, Optics Express ,vol. 21, No. 1,pp. 1218-1223.*

Wei Zhang et al., "Chaos Coding-Based QAM IQ-Encryption for Improved Security in OFDMA-PON," Jul. 29, 2014, IEEE Photonics Technology Letters, vol. 26, No. 19, Oct. 1, 2014, pp. 1964-1966.*

Ugis Senkans et al.,"Research on FBG-Based Sensor Networks and Their Coexistence with Fiber Optical Transmission Systems," Nov. 6, 2019, Journal of Sensors,vol. 2019, Article ID 6459387,,pp. 1-10.*

Peter M. Krummrich, "Optical amplification and optical filter based signal processing for cost and energy efficient spatial multiplexing," Aug. 15, 2011, Optics Express, vol. 19, No. 17, pp. 16636-16651.*

Josep M. F'abrega et al., "Modulated Grating Y-Structure Tunable Laser for λ-Routed Networks and Optical Access," Jul. 12, 2011,IEEE Journal of Selected Topics in Quantum Electronics, vol. 17, No. 6, Nov./Dec. 2011, pp. 1542-1549.*

Ryo Koma et al., "High Sensitivity and Wide Dynamic Range Burst-Mode Coherent Receiver that Controls Gains of a SOA and TIAs for Long-Reach and High-Splitting-Ratio PON," Apr. 26, 2018, 2017 European Conference on Optical Communication (ECOC), pp. 1-3.*

Ioannis Papagiannakis et al.,"Design Characteristics for a Full-Duplex IM/IM Bidirectional Transmission at 10 Gb/s Using Low Bandwidth RSOA," Dec. 22, 2019, Journal of Lightwave Technology, vol. 28, No. 7, Apr. 1, 2010. pp. 1094-1100.*

Zhiguo Zhang et al.,Bidirectional 50 GB/s/k WDM-PON based on optical intensity modulation and direct detection, Oct. 1, 2016,Opt Quant Electron (2016) 48, pp. 1-9.*

WIPO, International Search Report issued on Sep. 7, 2022.

European Patent Office, the Extended European Search Report dated Mar. 27, 2025, for corresponding EP application No. 22824272.3.

* cited by examiner

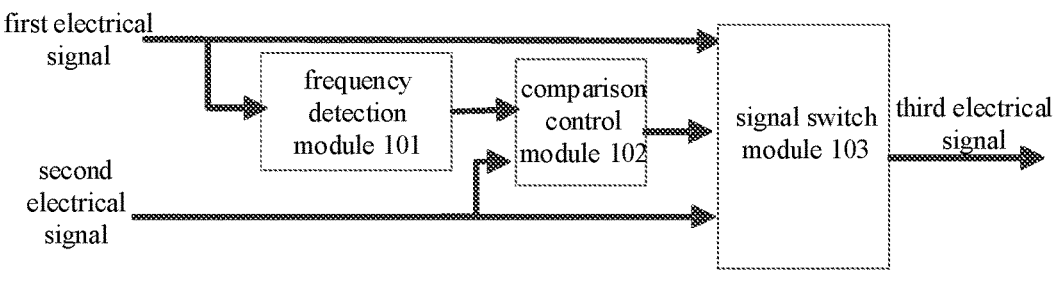

first electrical signal frequency detection module 101 comparison control module 102 second electrical signal signal switch module 103 third electrical signal

116  115  114  113 signal receiving end signal comparison module first detector filter optical amplifier

112 second detector

117 speed level indication signal multi-speed receiving apparatus

119 optical splitter

111

12.5G ONU

111

25G ONU

111

50G ONU

50G PON ONU 50G 12.5G /25G

FIG. 11

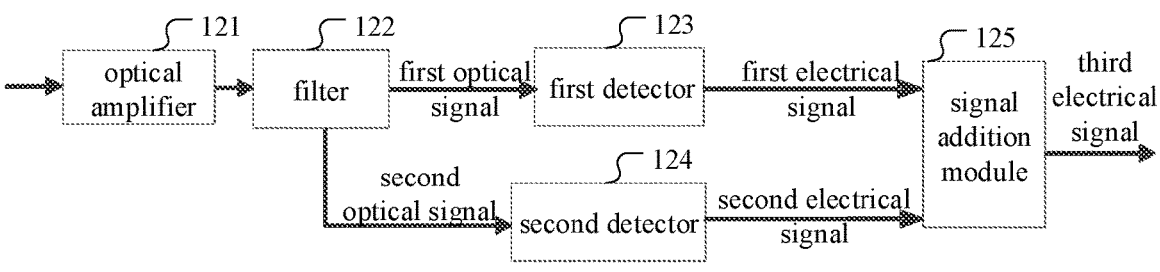

121 optical amplifier

122 filter first optical signal

123 first detector first electrical signal

125 signal addition module third electrical signal second optical signal

124 second detector second electrical signal

OPTICAL SIGNAL RECEIVING APPARATUS, SYSTEM AND METHOD, OPTICAL LINE TERMINAL, AND COMPUTER-READABLE STORAGE MEDIUM

CROSS-REFERENCE TO RELATED APPLICATIONS

The present disclosure claims the priority to Chinese Patent Application No. 202110677204.9 filed on Jun. 18, 2021, the contents of which are incorporated herein by reference in their entirety.

TECHNICAL FIELD

The present disclosure relates to the field of communication technology, and in particular, to an optical signal receiving apparatus, an optical line terminal, an optical signal receiving system, an optical signal receiving method, and a computer-readable storage medium.

BACKGROUND

With a continuous increase of bandwidth demand of a Passive Optical Network (PON), a speed of an optical signal is continuously increasing, resulting in an increase of levels of uplink speeds of the PON. For example, in a 50 G PON system, optical signals at a speed level of about 50 G, a speed level of about 12.5 G, and a speed level of about 25 G are desired to be supported simultaneously in an uplink. In a case where the PON system supports the optical signals at various different speeds, due to a fact that wavelength ranges corresponding to the optical signals at different speeds are different, if an optical receiver at the side of an optical line terminal (OLT) adopts a semiconductor optical amplifier (SOA), a band-pass filter (BPF), and a photo-detector (PD), i.e., an SOA+BPF+PD receiver architecture, since the BPF in such architecture is a narrowband filter, and an uncooled laser at a transmitting end operates in a relatively wide wavelength range, a wavelength range of the narrowband filter may be not matched with the wavelength range of the uncooled laser, which may produce a result that the SOA+BPF+PD receiver architecture cannot compatibly support the optical signals at the speed level of about 50 G, the speed level of about 12.5 G, and the speed level of about speed level of about 25 G in a case where the optical signals at the speed level of about 12.5 G and the speed level of about 25 G are transmitted by the uncooled laser.

A solution in the related technology is that: the optical signals at the speed level of about 12.5 G and the speed level of about 25 G are transmitted by a transmitter equipped with a cooler, and correspondingly, wavelength ranges corresponding to the optical signals at the speed level of about 12.5 G and the speed level of about 25 G are narrowed to 4 nm, which is the same as a wavelength range corresponding to the optical signal at the speed level of about 50 G. But due to the use of the transmitter equipped with the cooler, such solution leads to a significant increase in the cost of a terminal optical module. Therefore, if a manufacturing cost of the terminal optical module is not to be increased, the receiver architecture in the related technology is faced with some problems in the aspect of simultaneous supporting the optical signals at different speeds.

SUMMARY

In an aspect, an embodiment of the present disclosure provides an optical signal receiving apparatus, including: a filter and at least one detector; the filter is disposed following an amplifier, filter characteristics of the filter are configured according to a preset wavelength range, and the filter is configured to filter out noise in optical signals amplified by the amplifier and perform wavelength division processing on the optical signals to obtain at least one optical signal corresponding to the preset wavelength range; and the at least one detector is configured to convert the at least one optical signal into an electrical signal.

In an aspect, an embodiment of the present disclosure provides an optical line terminal, including: the optical signal receiving apparatus described above.

In an aspect, an embodiment of the present disclosure provides an optical signal receiving system, including: the optical line terminal described above, and an optical network unit.

In an aspect, an embodiment of the present disclosure provides an optical signal receiving method, including: filtering out, by a filter, noise in optical signals amplified by an amplifier, and performing, by the filter, wavelength division processing on the optical signals to obtain at least one optical signal corresponding to a preset wavelength range; and converting the at least one optical signal into an electrical signal by at least one detector.

In an aspect, an embodiment of the present disclosure provides a computer-readable storage medium having stored therein a computer program, the computer program, executed by a processor, to causes the processor to implement the optical signal receiving method described above.

BRIEF DESCRIPTION OF DRAWINGS

FIG. 10 is a schematic structural diagram of a signal comparison module, in Example Two, which detects a magnitude of a frequency of a first electrical signal for realizing a signal comparison according to an embodiment of the present disclosure;

FIG. 11 is a schematic structural diagram of a multi-speed receiving system in Example Two according to an embodiment of the present disclosure;

FIG. 12 is a schematic structural diagram of a multi-speed receiving apparatus in Example Three according to an embodiment of the present disclosure;

DETAIL DESCRIPTION OF EMBODIMENTS

Figure 1:
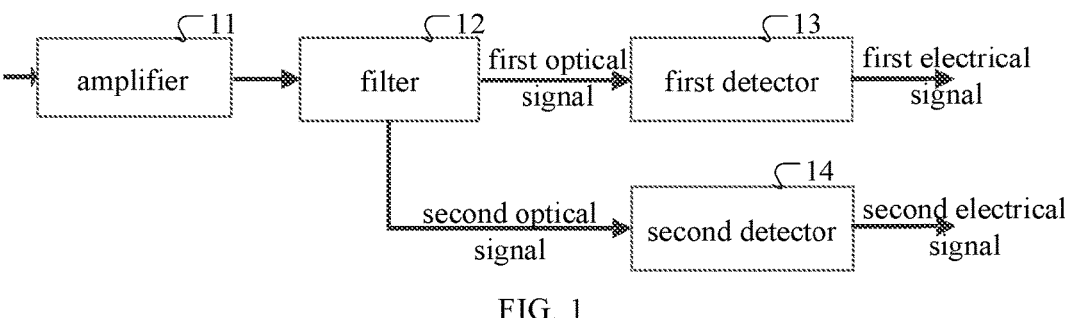
FIG. 1 is a schematic structural diagram of an optical signal receiving apparatus according to an embodiment of the present disclosure.

In order to enable those of ordinary skill in the art to better understand technical solutions of the present disclosure, an optical signal receiving apparatus, an optical line terminal, an optical signal receiving system, an optical signal receiving method, and a computer-readable storage medium provided by the present disclosure are described in detail below with reference to the drawings.

Exemplary embodiments will be described more fully below with reference to the drawings, but the exemplary embodiments described herein may be embodied in different forms, and should not be interpreted as being limited to the embodiments described herein. The embodiments are provided to make the present disclosure more thorough and complete, and are intended to enable those of ordinary skill in the art to fully understand the scope of the present disclosure.

The term "and/or" used herein includes any or all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the terms "comprise/include" and/or "be made/formed of" used herein indicate the presence of the particular features, integers, operations, elements and/or components, but do not exclude the presence or addition of one or more other features, integers, operations, elements, components and/or combinations thereof.

The embodiments of the present disclosure may be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to that illustrated by the drawings, but include modifications to configurations formed based on a manufacturing process. Thus, regions shown in the drawings are illustrative, and shapes of the regions shown in the drawings illustrate shapes of regions of elements, but are not intended to make limitations.

Unless otherwise defined, all terms (including technical terms and scientific terms) used herein have the same meaning as commonly understood by those of ordinary skill in the art. It should be further understood that terms, such as those defined in commonly used dictionaries, should be interpreted as having a meaning that is consistent with a meaning in the context of the existing technology and the background of the present disclosure, and should not be interpreted in an idealized or overly formal sense unless expressly so defined herein.

The present disclosure provides an optical signal receiving apparatus, including: a filter and at least one detector; the filter is disposed following an amplifier, filter characteristics of the filter are configured according to a preset wavelength range, and the filter is configured to filter out noise in optical signals amplified by the amplifier and perform wavelength division processing on the optical signals to obtain at least one optical signal corresponding to the preset wavelength range; and the at least one detector is configured to convert the at least one optical signal into an electrical signal. The at least one optical signal may include one optical signal or two optical signals, which may depend on a wavelength division of the optical signals. In addition, the number of detectors mainly depends on the number of optical signals, for example, the number of detectors may be equal to two.

In general, the optical signals, after being filtered by the filter, are divided and output in more than one optical path; after the division, one optical path merely allows the optical signals in a wavelength range corresponding to a high-speed level (i.e., a narrowband wavelength range) to pass through, and the optical signals in the remaining wavelength ranges pass through the other optical path. The filter characteristics of the filter are reasonably configured according to the preset wavelength range, such that the filter can not only have a function to filter out amplifier spontaneous emission noise (ASE noise) in high-speed signals, but can also perform wavelength division processing to realize a capability of detection in a divisional path. Thus, the filter has following two functions: on one hand, the filter can filter out the noise generated by the amplifier; on the other hand, the filter can achieve a wavelength division. With such solution, a beneficial effect that a low-speed uncooled laser being adopted at a far end can be supported is achieved.

Therefore, in view of the characteristic of the relative wide wavelength range of the optical signals, in the optical signal receiving apparatus provided in the present disclosure, by reasonably setting a transmission wavelength and a reflection wavelength of the filter, the optical signals in different wavelength ranges are output in different paths. The optical signal receiving apparatus can perform the wavelength division processing by the filter according to a corresponding relationship between speeds and wavelengths of signals to receive the original optical signals through different optical paths, so that the optical signal receiving apparatus is applicable to the optical signals at different speeds. Moreover, since the optical signal receiving apparatus can compatibly receive the optical signals with different wavelengths and at different speeds, the transmitter equipped with the cooler is not to be adopted at the transmitting end, so that the manufacturing cost of the terminal optical module is not to be increased.

FIG. 1 is a schematic structural diagram of an optical signal receiving apparatus according to an embodiment of the present disclosure, and the optical signal receiving apparatus is applicable to receiving optical signals at multiple speeds. As shown in FIG. 1, the receiving apparatus includes: an amplifier 11, a filter 12, a first detector 13, and a second detector 14. The amplifier 11 is configured to amplify original optical signals received. The filter 12 is configured to perform wavelength division processing and narrowband filtering on the amplified original optical signals to obtain a first optical signal corresponding to a first wavelength range and/or a second optical signal corresponding to a second wavelength range. The first detector 13 is configured to convert the first optical signal from the filter 12 into a first electrical signal, the second detector 14 is configured to convert the second optical signal from the filter 12 into a second electrical signal, and one of the first optical signal and the second optical signal is a narrowband optical signal. The filter 12 performs the narrowband filtering and the wavelength division processing on the amplified high-speed signals, so as to reduce the ASE noise of the amplifier 11 from entering the detector 13 and the detector 14, thereby ensuring the performance of high-sensitivity detection of the optical signal receiving apparatus.

The amplifier 11 in the optical signal receiving apparatus provided in the present disclosure includes an optical amplifier, and may include a semiconductor optical amplifier (SOA). The filter 12 may include a single Thin Film Filter (TFF), a micro-optical module Z-Block, and/or a photonic integrated device (e.g., a Mach-Zehnder interferometer, MZI). The filter 12 in the optical signal receiving apparatus provided in the present disclosure may be referred to as a filter module and is configured to perform a wavelength division function and a narrowband filtering function, any device capable of performing the wavelength division function and the narrowband filtering function may be used as the filter 12, and the implementation of the filter 12 is not limited in the present disclosure. In addition, the first detector 13 and the second detector 14 may include various detectors such as a PIN detector or an APD detector.

Due to a certain corresponding relationship between speed levels and wavelength ranges of signals, in a case where the original optical signals correspond to a plurality of speed levels, wavelength ranges of the optical signals corresponding to different speed levels are different; therefore, in the architecture of an optical amplifier plus a narrowband filter plus a detector in the related technology, the narrowband filter may cut off the optical signals beyond a narrowband wavelength range, with the result that the receiver cannot receive the optical signals which are at a low-speed level, have a relatively wide wavelength range, and go beyond the narrowband wavelength range, that is, the architecture of the optical amplifier plus the narrowband filter plus the detector in the related technology cannot compatibly support the optical signals at multiple speeds. In the optical signal receiving apparatus provided in the present disclosure, the wavelength range of the original optical signals is divided into the first wavelength range and the second wavelength range in advance, and correspondingly, the optical signal in the first wavelength range and the optical signal in the second wavelength range are respectively transmitted through a transmission optical path and a reflection optical path of the filter to be received by different detectors, so that a compatible reception of the optical signals at multiple speeds is realized.

In addition, the optical signal receiving apparatus according to the present disclosure may be provided in various optical devices, for example, the optical signal receiving apparatus may be provided inside an optical line terminal or inside an optical network unit. The present disclosure does not limit the position of the optical signal receiving apparatus, as long as the optical signal receiving apparatus can realize the compatible reception of the optical signals at multiple speeds.

Thus, in the optical signal receiving apparatus provided in the present disclosure, the filter can perform the wavelength division processing on the amplified original optical signals to obtain the first optical signal corresponding to the first wavelength range and the second optical signal corresponding to the second wavelength range; and correspondingly, the first detector converts the first optical signal from the filter into the first electrical signal, and the second detector converts the second optical signal from the filter into the second electrical signal. Thus, in view of the characteristic that the wavelength ranges of the optical signals at multiple speeds are different, in the optical signal receiving apparatus provided in the present disclosure, by reasonably setting the transmission wavelength and the reflection wavelength of the filter, the optical signal in the first wavelength range can be converted into the first electrical signal through the first detector, and the optical signal in the second wavelength range can be converted into the second electrical signal through the second detector. The optical signal receiving apparatus can perform the wavelength division processing by the filter according to the corresponding relationship between the speeds and the wavelengths of the signals to divide the original optical signals into paths, and further convert the original optical signals into two electrical signals through the detectors, so that the optical signal receiving apparatus is applicable to the optical signals at multiple speeds.

Figure 2:
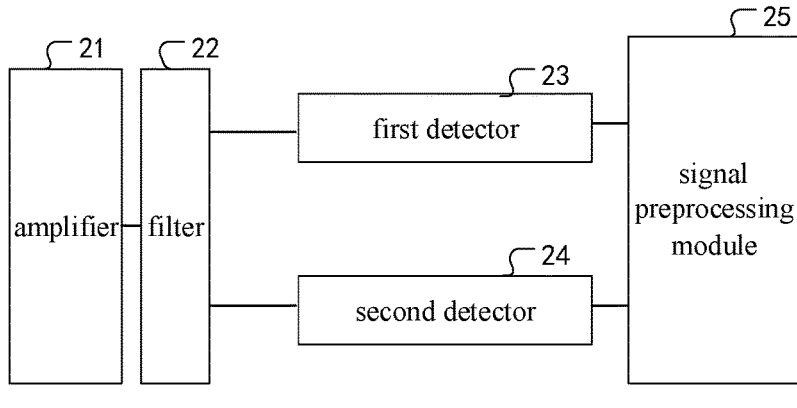
FIG. 2 is a schematic structural diagram of an optical signal receiving apparatus according to an embodiment of the present disclosure.

FIG. 2 is a schematic structural diagram of an optical signal receiving apparatus according to an embodiment of the present disclosure, and the optical signal receiving apparatus is applicable to receiving optical signals at multiple speeds. As shown in FIG. 2, the receiving apparatus includes: an amplifier 21, a filter 22, a first detector 23, a second detector 24, and a signal preprocessing module 25.

The amplifier 21 is configured to amplify original optical signals received. The filter 22 is configured to perform wavelength division processing and narrowband filtering on the amplified original optical signals to obtain a first optical signal corresponding to a first wavelength range and a second optical signal corresponding to a second wavelength range. The first detector 23 is configured to convert the first optical signal from the filter 22 into a first electrical signal, the second detector 24 is configured to convert the second optical signal from the filter 22 into a second electrical signal, and one of the first optical signal and the second optical signal is a narrowband optical signal. The filter 22 performs the narrowband filtering and the wavelength division processing on the amplified high-speed signals, so as to reduce the ASE noise of the amplifier 21 from entering the detector 23 and the detector 24, thereby ensuring the performance of high-sensitivity detection of the optical signal receiving apparatus.

The amplifier 21 in the optical signal receiving apparatus provided in the present disclosure includes an optical amplifier, and may include an SOA. The filter 22 may include a single TFF, a micro-optical module Z-Block, and/or a photonic integrated device (e.g., the MZI). The filter 22 in the optical signal receiving apparatus provided in the present disclosure may be referred to as a filter module and is configured to perform a wavelength division function and a narrowband filtering function, any device capable of performing the wavelength division function and the narrowband filtering function may be used as the filter 22, and the implementation of the filter 22 is not limited in the present disclosure. In addition, the first detector 23 and the second detector 24 may include various detectors such as a PIN detector or an APD detector.

Due to a certain corresponding relationship between speed levels and wavelength ranges of signals, in a case where the original optical signals correspond to a plurality of speed levels, wavelength ranges of the optical signals corresponding to different speed levels are different; therefore, in the architecture of the optical amplifier plus the narrowband filter plus the detector in the related technology, the narrowband filter may cut off the optical signals beyond a narrowband wavelength range, with the result that the receiver cannot receive the optical signals which are at a low-speed level, have a relatively wide wavelength range and go beyond the narrowband wavelength range, that is, the architecture of the optical amplifier plus the narrowband filter plus the detector in the related technology cannot compatibly support the optical signals at multiple speeds. In the optical signal receiving apparatus provided in the present disclosure, the wavelength range of the original optical signals is divided into the first wavelength range and the second wavelength range in advance, and correspondingly, the optical signal in the first wavelength range and the optical signal in the second wavelength range are respectively transmitted through a transmission optical path and a reflection optical path of the filter to be received by different detectors, so that a compatible reception of the optical signals at multiple speeds is realized.

The filter 22 is provided with a first output optical path and a second output optical path; a passband range of the first output optical path is corresponding to the first wavelength range, and a passband range of the second output optical path is corresponding to the second wavelength range; and the filter 22 may be configured to perform transmission processing or reflection processing on the first optical signal corresponding to the first wavelength range and then transmit the first optical signal to the first detector through the first output optical path, and perform reflection processing or transmission processing on the second optical signal corresponding to the second wavelength range and then transmit the second optical signal to the second detector through the second output optical path.

For example, a transmission wavelength of the filter 22 is corresponding to the first wavelength range, and a reflection wavelength of the filter 22 is corresponding to the second wavelength range; the filter 22 may be configured to perform the transmission processing on the first optical signal corresponding to the first wavelength range and then transmit the first optical signal to the first detector 23 through the first output optical path, and perform the reflection processing on the second optical signal corresponding to the second wavelength range and then transmit the second optical signal to the second detector 24 through the second output optical path; and in some implementations, the division of the first wavelength range and the second wavelength range is carried out according to a corresponding relationship between speeds and wavelengths of the optical signals, and thus the first wavelength range is corresponding to the original optical signal at a first speed, and the second wavelength range is corresponding to the original optical signal at a second speed. The corresponding relationship between the speeds and the wavelengths of the optical signals may be determined according to laser parameters of an optical signal transmitting end. In some implementations, the first speed is greater than the second speed, and the first wavelength range is smaller than the second wavelength range. For example, in some implementations, the optical signal receiving apparatus can compatibly receive optical signals at three speeds, and correspondingly, the first speed includes: 50 gigabits per second (Gbit/s), and the second speed includes: 12.5 Gbit/s and/or 25 Gbit/s. Alternatively, the first speed includes: 50 Gbit/s and 25 Gbit/s, and the second speed includes 12.5 Gbit/s. The present disclosure does not limit the division of the first speed and the second speed. The first speed is at a first speed level, and the second speed is at a second speed level. The corresponding relationship between the speeds and the wavelengths of the optical signals is a corresponding relationship between the speed levels and the wavelength ranges of the optical signals.

Certainly, ranges of the reflection wavelength and the transmission wavelength may be interchanged, which is not limited in the present disclosure.

In addition, the division of the first wavelength range and the second wavelength range depends on the laser parameters of the optical signal transmitting end, and the optical signal transmitting end may be an optical network unit. In some implementations, the division of the first wavelength range and the second wavelength range may be implemented through at least one of the following two methods including a first method and a second method.

Figure 4:
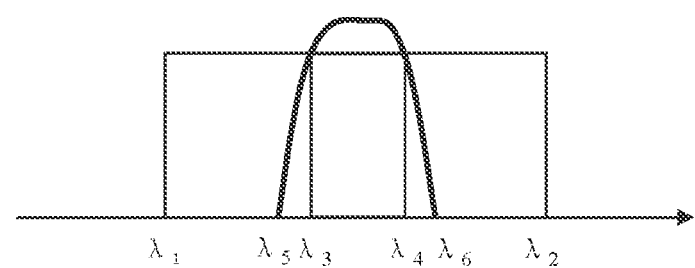
FIG. 4 is a schematic diagram illustrating a division of an uplink wavelength range according to an embodiment of the present disclosure.

In the first method, the first wavelength range is in a middle region of the second wavelength range, in other words, the second wavelength range may include: a first sub-range on a first side (e.g., a left side) of the first wavelength range, and a second sub-range on a second side (e.g., a right side) of the first wavelength range. That is, the second wavelength range includes portions of the preset wavelength range beyond the first wavelength range. The first sub-range may be on the first side of the first wavelength range and spaced apart from the first wavelength range by a first preset wavelength; and the second sub-range may be on the second side of the first wavelength range and spaced apart from the first wavelength range by a second preset wavelength. The first preset wavelength may be the same as or different from the second preset wavelength. For example, FIG. 4 is a schematic diagram illustrating A division of an uplink wavelength range according to an embodiment of the present disclosure, and as illustrated by FIG. 4, the first wavelength range is [λ3, λ4], and the second wavelength range includes: the first sub-range [λ1, λ5] on the left side of the first wavelength range and spaced apart from the first wavelength range by the first preset wavelength, and the second sub-range [λ6, λ2] on the right side of the first wavelength range and spaced apart from the first wavelength range by the second preset wavelength. The first preset wavelength is equal to a difference between λ3 and λ5, and the second preset wavelength is equal to a difference between λ6 and λ4. Correspondingly, the filter is configured to perform the transmission processing or the reflection processing on the first optical signal corresponding to the first wavelength range and then transmit the first optical signal to the first detector through the first output optical path, and perform the reflection processing or the transmission processing on the second optical signal corresponding to the second wavelength range (including the first sub-range and the second sub-range) and then transmit the second optical signal to the second detector through the second output optical path.

In the second method, the first wavelength range and the second wavelength range are not overlapped, and a spacing transition band exists between the first wavelength range and the second wavelength range, and in this case, the second optical signal is the optical signal corresponding to the second wavelength range. The spacing transition band refers to a third wavelength range between the first wavelength range and the second wavelength range, and the third wavelength range is not overlapped with the first wavelength range and the second wavelength range, so that a transition waveband serving as a spacing is provided between the first wavelength range and the second wavelength range. The present disclosure does not limit the division of the first wavelength range and the second wavelength range.

The signal preprocessing module 25 is configured to preprocess the first electrical signal output by the first detector 23 and the second electrical signal output by the second detector 24 to obtain a third electrical signal subjected to preprocessing, and output the third electrical signal to a signal receiving end. The signal preprocessing module 25 mainly functions to analyze and process the first electrical signal and the second electrical signal to obtain the third electrical signal to be output to the signal receiving end. A plurality of preprocessing methods may be adopted, for example, signal comparison processing or signal addition processing may be adopted, and correspondingly, the third electrical signal may be an electrical signal, with a better quality, extracted from the first electrical signal and the second electrical signal, or may be an electrical signal obtained after preprocessing, such as adding, the first electrical signal and the second electrical signal. Details of the preprocessing methods are not limited in the present disclosure.

In some implementations, the signal preprocessing module 25 includes a signal comparison module. Correspondingly, the signal comparison module is configured to compare the first electrical signal with the second electrical signal in terms of at least one of a DC component, a peak-to-peak value, a signal-to-noise ratio or a signal frequency to obtain a comparison result, and take the first electrical signal or the second electrical signal as the third electrical signal according to the comparison result.

In some implementations, the signal preprocessing module 25 includes a signal addition module. Correspondingly, the signal addition module is configured to add the first electrical signal to the second electrical signal to obtain the third electrical signal.

Thus, since the optical signal receiving apparatus provided in the present disclosure convert two electrical signals into one electrical signal by the signal preprocessing module 25, the signal receiving end is to be provided with merely one pair of receiving pins configured to receive the third electrical signal, and there is no need to provide two pairs of receiving pins for receiving the first electrical signal and the second electrical signal respectively, so that the hardware cost of the signal receiving end is reduced, a size of the signal receiving end is reduced, and miniaturization packaging processing on the signal receiving end is facilitated to be realized. The signal receiving end in the optical signal receiving apparatus provided in the present disclosure may be various network devices having a function of receiving optical signals, for example, the signal receiving end may be an optical line terminal, and correspondingly, the optical signal receiving apparatus provided in the present disclosure may be disposed inside the optical line terminal, or may be in communication connection with the optical line terminal.

In some implementations, in order to facilitate subsequent processing on the received electrical signal by the signal receiving end, the signal receiving end is to be informed of a speed level of the signal. Accordingly, the optical signal receiving apparatus may further include: a signal-speed-level indication module configured to identify a wavelength range and a speed level of the signal according to the signal preprocessing module 25, and send a speed level indication signal to the signal receiving end. Therefore, the signal-speed-level indication module is mainly configured to determine a speed level of the third electrical signal according to a wavelength and a speed of the third electrical signal, and send a speed level indication signal to the signal receiving end. For example, in a case where the first optical signal is corresponding to the narrowband wavelength range, if the third electrical signal is completely output from the first electrical signal, and the third electrical signal is at a relatively high speed, the signal received by the signal receiving end is a high-speed-level signal, and correspondingly, a high-speed-level indication signal is sent to the signal receiving end by the signal-speed-level indication module; if the third electrical signal is completely output from the second electrical signal, the signal received by the signal receiving end is a low-speed-level signal, and correspondingly, a low-speed-level indication signal is sent to the signal receiving end by the signal-speed-level indication module; if the third electrical signal is completely output from the first electrical signal, and the third electrical signal is at a relatively low speed, the signal received by the signal receiving end is a low-speed-level signal, and correspondingly, a low-speed-level indication signal is sent to the signal receiving end by the signal-speed-level indication module; and if the third electrical signal is output after a comparison between the first electrical signal and the second electrical signal (or after an addition of the first electrical signal and the second electrical signal, with both the first electrical signal and the second electrical signal including alternating current signals), the signal received by the signal receiving end is a low-speed-level signal, and correspondingly, a low-speed-level indication signal is sent to the signal receiving end by the signal-speed-level indication module. In short, since the signal preprocessing module 25 can determine the wavelength and the speed level of the third electrical signal during preprocessing the first electrical signal and the second electrical signal, a corresponding speed level indication signal can be sent to the signal receiving end according to a determination result of the signal preprocessing module 25.

In some implementations, the original optical signals in the optical signal receiving apparatus provided in the present disclosure may be uplink optical signals transmitted from an optical network unit to an optical line terminal.

An embodiment of the present disclosure further provides an optical line terminal, including: the optical signal receiving apparatus described above.

In some implementations, the signal preprocessing module may be omitted, so that the first electrical signal and the second electrical signal are directly output to the signal receiving end, and in this case, the signal receiving end is to be provided with two pairs of receiving pins configured to receive the first electrical signal and the second electrical signal respectively. In a case where the optical signal receiving apparatus does not include the signal preprocessing module, in order to facilitate the subsequent processing on the received electrical signal by the signal receiving end (i.e., the optical line terminal), a speed level of the received signal is to be acquired according to a time slot scheduling table. In some implementations, the optical line terminal includes: a signal selection module configured to determine a speed level of the signal corresponding to a current scheduled time slot according to a corresponding relationship, between scheduled time slots and speed levels of signals, which is stored in the time slot scheduling table, and select, according to the speed level of the signal, the first electrical signal or the second electrical signal as an effective electrical signal to be received. The effective electrical signal refers to an electrical signal effectively received and actually used for the subsequent processing. Since the optical line terminal is provided with two pairs of receiving pins for correspondingly receiving the first electrical signal and the second electrical signal respectively, and the first electrical signal and the second electrical signal are respectively corresponding to different wavelength ranges, in some implementations, in a case where it is known that the optical signal received at a current time is a high-speed-level optical signal, the first electrical signal is an effective electrical signal component, and the second electrical signal is an invalid electrical signal component, the first electrical signal is determined as the effective electrical signal to be received, and the receiving pins corresponding to the first electrical signal are controlled to operate; and in a case where it is known that the optical signal received at the current time is a low-speed-level optical signal, the first electrical signal or the second electrical signal may be the effective electrical signal, the signal selection module in the optical line terminal respectively determines a bit error rate of the first electrical signal in a physical layer and a bit error rate of the second electrical signal in the physical layer, and takes one of the first electrical signal and the second electrical signal that has the lower bit error rate as the effective electrical signal to be received.

An embodiment of the present disclosure further provides an optical signal receiving system, including: the optical line terminal described above, and an optical network unit.

In summary, in the optical signal receiving apparatus provided in the present disclosure, the filter can perform the wavelength division processing and the narrowband filtering on the amplified original optical signals to obtain the first optical signal corresponding to the first wavelength range and the second optical signal corresponding to the second wavelength range; and correspondingly, the first detector converts the first optical signal from the filter into the first electrical signal, and the second detector converts the second optical signal from the filter into the second electrical signal. Thus, in view of the characteristic that the wavelength ranges of the optical signals at multiple speed levels are different, in the optical signal receiving apparatus provided in the present disclosure, by reasonably setting the transmission wavelength and the reflection wavelength of the filter, the optical signal in the first wavelength range can be converted into the first electrical signal through the first detector and the optical signal in the second wavelength range can be converted into the second electrical signal through the second detector. The optical signal receiving apparatus can perform the wavelength division processing by the filter according to the corresponding relationship between the speeds and the wavelength ranges of the signals to divide the original optical signals into paths, and further convert the original optical signals into two electrical signals by the detectors, so that the optical signal receiving apparatus is applicable to the optical signals at multiple speeds. Moreover, by disposing the signal preprocessing module in the optical signal receiving apparatus provided in the present disclosure, the two electrical signals can be converted into one electrical signal, so that the number of pins of the signal receiving end is reduced, the hardware cost is reduced, and a size of the device is reduced.

For ease of understanding, details of the implementation of the optical signal receiving apparatus provided in the present disclosure are illustrated below by several examples. In addition, before the description of the several examples, a brief introduction is first given below for an application scenario of the present disclosure.

Figure 3:
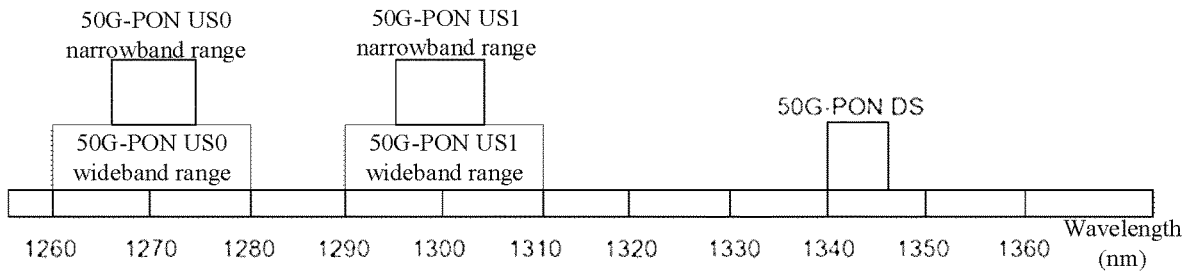
FIG. 3 is a schematic diagram illustrating a narrowband range and a wideband range according to an embodiment of the present disclosure.

In recent years, optical access networks based on the Time-Division Multiplexing Passive Optical Network (TDM-PON) technology have been rapidly developed, and 10 Gigabit-Passive Optical Networks (10 G PONs) have been deployed in a large scale and have gradually replaced Gigabit-Capable Passive Optical Networks (GPONs). In the future, for realizing fixed-mobile integration and full-service access such as large-bandwidth home broadband access, higher-bandwidth government-enterprise access, and 5 G small base station backhaul at the access network level, a higher expectation is proposed on the bandwidth of the PON. A 50 Gbit/s PON (based on Time-Division Multiplexing, i.e., a 50 G TDM PON) has become an evolution direction of the 10 G PON. The ITU-T standard G.hsp.pmd has currently defined three uplink speed levels of about 12.5 G, about 25 G, and about 50 G in a 50 G PON system. Therefore, in future actual deployment processes, ONUs for three different uplink speeds may exist in a same Optical Distribution Network (ODN), and accordingly, an OLT device and an OLT optical module are desired to compatibly support three uplink receiving speeds simultaneously. In a case where an uplink speed is at about 50 G, the line speed is increased so greatly that it is hard to meet a link budget expectation of about 32 decibels or above of a PON by an APD receiver of the related technology. In order to reuse the deployed ODN, a high-sensitivity receiver is to be implemented, and a preamplifier is a solution capable of effectively improving the sensitivity of the receiver. However, the amplifier generates the ASE noise which affects the performance of the receiver, and therefore, an optical filter (e.g., a BPF) is to be added, and a wavelength of the filter is to be matched with a wavelength of a transmitter. In order to reduce a cost of design of the filter and avoid using a tunable filter, the wavelength of the transmitter is to be narrowed to a certain range, and therefore, a narrow wavelength solution is desired for the 50 G PON. For a PON system, due to a terminal in the PON system expects an extremely low cost of devices, an uncooled DML laser is generally adopted in an uplink, and the laser has a relatively wide wavelength range which is usually about 20 nm. Therefore, according to the uplink wavelength planning in the current standard of the 50 G PON, the two wavelength range options, including a wide wavelength range of about 20 nm and a narrow wavelength range of about 4 nm, are defined for the speed of about 50 G, and the narrow wavelength range is in the middle of the wide wavelength range. For example, FIG. 3 is a schematic diagram illustrating a narrowband range and a wideband range according to an embodiment of the present disclosure. In FIG. 3, US0 and US1 represent two wavelength solutions for the 50 G PON coexisting with GPON and XGPON, respectively. Thus, in a case where the 50 G PON system meets an optical power budget above 32 decibels, an OLT-side optical receiver at the speed level of about 50 G is desired to adopt the SOA+BPF+PD receiver architecture, but such architecture cannot be simultaneously compatible with the uncooled laser at speed levels of about 12.5 G and 25 G at the transmitting end. Therefore, an OLT reception optical path is divided into two optical paths by a 1:2 optical splitter, and two receivers are adopted to respectively receive uplink signals at the speed of about 50 G and uplink signals at the speed of about 12.5 G/25 G. However, since the optical splitter is not sensitive to wavelengths, a loss of 3 decibels is added to the original link budget, which leads to a serious challenge to the performance of the optical device. Moreover, two pairs of uplink signal pins are desired to be provided in the above solution, but the two pairs of uplink signal pins are not favorable for miniaturization packaging of the OLT optical module.

The following five examples provided in the present disclosure are all implemented in the above application scenario.

Example One

A multi-speed receiving apparatus and a multi-speed receiving system are provided in this example. A schematic structural diagram of the multi-speed receiving apparatus provided in this example may be referred to FIG. 1. As shown in FIG. 1, the multi-speed receiving apparatus includes the optical amplifier 11, the filter 12, the first detector 13, and the second detector 14. The optical amplifier 11 performs optical signal amplification processing on received uplink optical signals. Based on the uplink wavelength planning of the 50 G PON, the filter 12 transmits the optical signal in a narrowband wavelength range (corresponding to the first wavelength range) in the uplink wavelength range to the first detector 13 through a first optical path, and transmits the optical signal (corresponding to the second wavelength range) beyond the narrowband wavelength range in the uplink wavelength range to the second detector 14 through a second optical path. The first detector 13 converts the narrowband uplink optical signal passing through the first optical path into a first electrical signal to output it. The second detector 14 converts the uplink optical signal, which goes beyond the narrowband wavelength band and passes through the second optical path, into a second electrical signal to output it. During performing wavelength division processing on the uplink optical signals, the filter 12 filters out the ASE noise generated by the optical amplifier 11, so that the sensitivity that the uplink optical signals at the speed level of about 50 G is received is effectively improved without additionally introducing a link loss to a PON system, and an optical path of a receiver is also greatly simplified. As for the uplink wavelength planning of the 50 G PON, FIG. 4 is a schematic diagram illustrating a division of an uplink wavelength range, and referring to FIG. 4, the filter has the following characteristics: in a case where an uplink broadband wavelength range of the 50 G PON is [λ1, λ2] and an uplink narrowband wavelength range of the 50 G PON is [λ3, λ4], the first optical path (e.g., a transmission optical path) of the filter has a passband range of [λ3, λ4] and cut-off wavelength ranges of [λ1, λ5] and [λ6, λ2], and the second optical path (e.g., a reflection optical path) of the filter has passband ranges of [λ1, λ5] and [λ6, λ2] and a cut-off wavelength range of [λ3, λ4]. The wavelength ranges of [λ5, λ3] and [λ4, λ6] are transition bands of the filter, and the optical signals in these wavelength ranges partially enter the first optical path and partially enter the second optical path. For example, for an uplink wavelength option, from about 1260 nm to about 1280 nm, of the 50 G PON, λ1 is 1260 nm, λ2 is 1280 nm, and λ3, λ4, λ5, and λ6 may be wavelengths in the range from 1260 nm to 1280 nm (exclusive of 1260 nm and 1280 nm). For example, λ3 is about 1268 nm, λ4 is about 1272 nm, λ5 is about 1266 nm, and λ6 is about 1274 nm. Thus, λ1<λ5<λ3<λ4<λ6<λ2.

The optical amplifier 11 may include an SOA, the filter 12 may include a single TFF, a micro-optical module Z-Block, a photonic integrated device (e.g., the MZI), and the detector 13 and the detector 14 may include a PIN detector or an APD detector. In some implementations, the multi-speed receiving apparatus may be an OLT multi-speed receiving apparatus, which may be formed by discrete devices and may be packaged into an optical receiving module or a hybrid integrated optical chip. Taking the OLT multi-speed receiving apparatus being a multi-speed optical receiving module as an example, the multi-speed optical receiving module may further include an optical path coupling device (e.g., a lens), an optical adapter, a metal housing, and a Flexible Printed Circuit (FPC).

Figure 5:
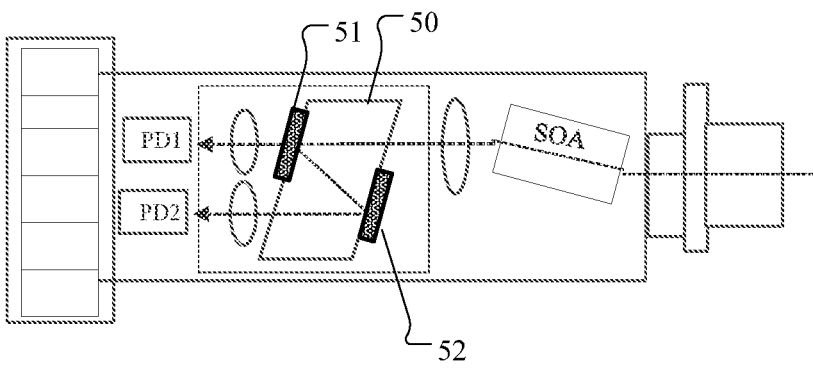
FIG. 5 is a schematic structural diagram of a multi-speed optical receiving module in Example One according to an embodiment of the present disclosure.

FIG. 5 is a schematic structural diagram of a multi-speed optical receiving module according to an embodiment of the present disclosure. As shown in FIG. 5, the multi-speed optical receiving module includes: an SOA, a micro-optical module Z-Block 50, a detector PD1, a detector PD2, lenses (corresponding to circular parts in FIG. 5), an optical adapter, and an FPC. The micro-optical module Z-Block 50 may include a filter 51 and a filter 52. The SOA receives uplink incident optical signals through the optical adapter and amplifies the uplink optical signals. The amplified optical signals are converted into parallel light through a first lens and the parallel light is input to the micro-optical module Z-Block; in the micro-optical module Z-Block, the input optical signal in the narrowband wavelength range is transmitted through the filter 51, then converged through a second lens, and is subsequently input into the detector PD1 to be converted into the first electrical signal, and the input optical signals beyond the narrowband wavelength range and beyond the transition bands of the filter 51 are subjected to a total reflection by the filter 51, then subjected to a total reflection by the filter 52, and finally input, through a third lens, into the detector PD2 to be converted into the second electrical signal; and the input uplink optical signal in the transition bands of the filter 51 is partially transmitted through the filter 51 and then input into the detector PD1 to be converted into the first electrical signal, and is partially reflected by the filter 51, then subjected to a total reflection by the filter 52, and finally input to the detector PD2 to be converted into the second electrical signal. The multi-speed optical receiving module further includes the FPC and is connected to an external circuit through the FPC, and the FPC is connected to the detector PD1 and the detector PD2, and outputs the first electrical signal and the second electrical signal converted by the detector PD1 and the detector PD2 to the external circuit. In some implementations, the external circuit is further connected to the detector PD1 and the detector PD2 and control pins of the SOA through the FPC, so as to perform functions of supplying power, reading monitoring signals, and adjusting currents. In the multi-speed optical receiving module, the detector PD1 and the detector PD2 converting the input optical signals into the electrical signals further includes converting, after converting the optical signals into current signals, the current signals into differential voltage signals through a transimpedance amplifier (TIA) circuit to output them.

In the multi-speed optical receiving module, the optical characteristics of the filter 51 conform to the aforesaid definition of the wavelengths, that is, for the 50 G PON having the uplink broadband wavelength range of [λ1, λ2] and the uplink narrowband wavelength range of [λ3, λ4], a transmission optical path of the filter 51 has a passband range of [λ3, λ4] and cut-off wavelength ranges of [λ1, λ5] and [λ6, λ2], and a reflection optical path of the filter 51 has passband ranges of [λ1, λ5] and [λ6, λ2] and a cut-off wavelength range of [λ3, λ4]. The wavelength ranges of [λ5, λ3] and [λ4, λ6] are the transition bands of the filter 51, and the optical signals in these wavelength ranges partially enter the transmission optical path and partially enter the reflection optical path. The filter 52 performs a total reflection on all the optical signals in the uplink wavelength range (including the broadband wavelength range and the narrowband wavelength range) of the 50 G PON or the optical signals beyond the narrowband wavelength range (i.e., beyond the wavelength ranges of [λ1, λ3] and [λ4, λ2]), that is, all the wavelengths in the uplink wavelength range of the 50 G PON fall within a passband range of the reflection optical path of the filter 51.

Figure 6:
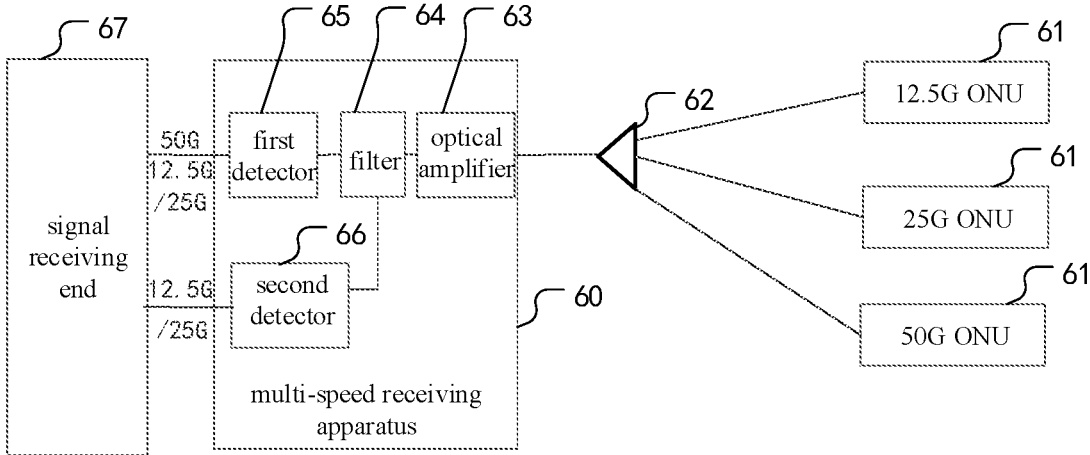
FIG. 6 is a schematic diagram of a system structure of a multi-speed receiving system in Example One according to an embodiment of the present disclosure.

FIG. 6 is a schematic structural diagram of a multi-speed receiving system provided in the Example One according to an embodiment of the present disclosure. The multi-speed receiving system includes: a multi-speed receiving apparatus 60, a plurality of Optical Network Units (ONUs) 61, an optical splitter 62, and a signal receiving end 67. The multi-speed receiving apparatus 60 includes: an optical amplifier 63, a filter 64, a first detector 65, and a second detector 66. The signal receiving end 67 may be an optical line terminal. The signal receiving end 67 may include 50 G PON Media Access Control (MAC). As shown in FIG. 6, the plurality of ONUs 61 serve as signal transmitting ends, the ONUs can transmit optical signals at different speed levels, and including optical signals at the speed level of about 12.5 G, the speed level of about 25 G, the speed level of about 50 G, or the like. The optical signals that are respectively corresponding to different speed levels and transmitted by the plurality of ONUs are processed by the optical splitter 62, and are then sent to the multi-speed receiving apparatus 60. In the multi-speed receiving apparatus 60, the optical amplifier 63 is responsible for amplifying the received optical signals, and the filter 64 is configured to perform the wavelength division processing as described above, and respectively transmit the optical signals subjected to the wavelength division processing to the first detector 65 and/or the second detector 66. As shown in FIG. 6, the first detector 65 is mainly responsible for receiving and processing a high-speed optical signal, and a low-speed signal in a first wavelength range, and the second detector 66 is mainly responsible for receiving and processing a low-speed optical signal in a second wavelength range.

In some implementations, in the multi-speed receiving system provided in this example, a signal amplification module and a clock data recovery module may be further provided between the multi-speed receiving apparatus 60 and the signal receiving end 67. The signal amplification module is configured to amplify the first electrical signal and the second electrical signal output by the multi-speed receiving apparatus, and the clock data recovery module is configured to perform clock data recovery on the signals.

In some implementations, the signal receiving end 67 includes a signal selection unit, for example, in a case where the signal receiving end 67 is an optical line terminal, the signal selection unit is included in a 50 G PON MAC chip of the optical line terminal, and is configured to determine a speed level of the signal corresponding to a current scheduled time slot according to a corresponding relationship, between scheduled time slots and speeds of signals, stored in a time slot scheduling table, and select, according to the corresponding speed level of the signal, the first electrical signal or the second electrical signal as an effective electrical signal to be received. For example, the time slot scheduling table is read according to DBA scheduling information, so that uplink signals at different speed levels are selected to be transmitted to an MAC protocol processing module. In a case where it is known that the optical signal received at a current time is a high-speed-level optical signal, the first electrical signal is an effective electrical signal component, so that the first electrical signal is controlled to enter the MAC protocol processing module; and in a case where it is known that the optical signal received at the current time is a low-speed-level optical signal, the first electrical signal or the second signal may be the effective electrical signal, according to the bit error rates in the physical layer (PHY), one of the first electrical signal and the second signal that has the lower bit error rate is selected and determined as the effective electrical signal to enter a Framing sublayer of the MAC protocol processing module.

Example Two

Figure 7:
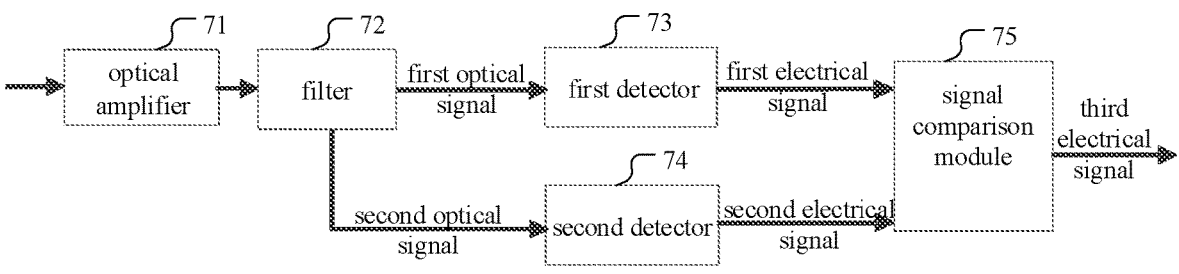
FIG. 7 is a schematic structural diagram of a multi-speed receiving apparatus in Example Two according to an embodiment of the present disclosure.

A multi-speed receiving apparatus and a multi-speed receiving system are provided in this example. FIG. 7 is a schematic structural diagram of the multi-speed receiving apparatus provided in this example. As shown in FIG. 7, the multi-speed receiving apparatus includes an optical amplifier 71, a filter 72, a first detector 73, a second detector 74, and a signal comparison module 75. Thus, a main difference between the Example One and the Example Two lies in the addition of the signal comparison module 75, and the signal comparison module 75 is configured to compare the quality of the first electrical signal with the quality of the second electrical signal and output one of the first electrical signal and the second electrical signal that has the better quality. The signal comparison module 75 comparing the quality of the first electrical signal with the quality of the second electrical signal includes: comparing the first electrical signal with the second electrical signal in terms of a magnitude of a direct current (DC) component, a magnitude of a peak-to-peak value, a magnitude of a comparison reference level, a magnitude of a signal-to-noise ratio, and/or a magnitude of a frequency.

Figure 8:
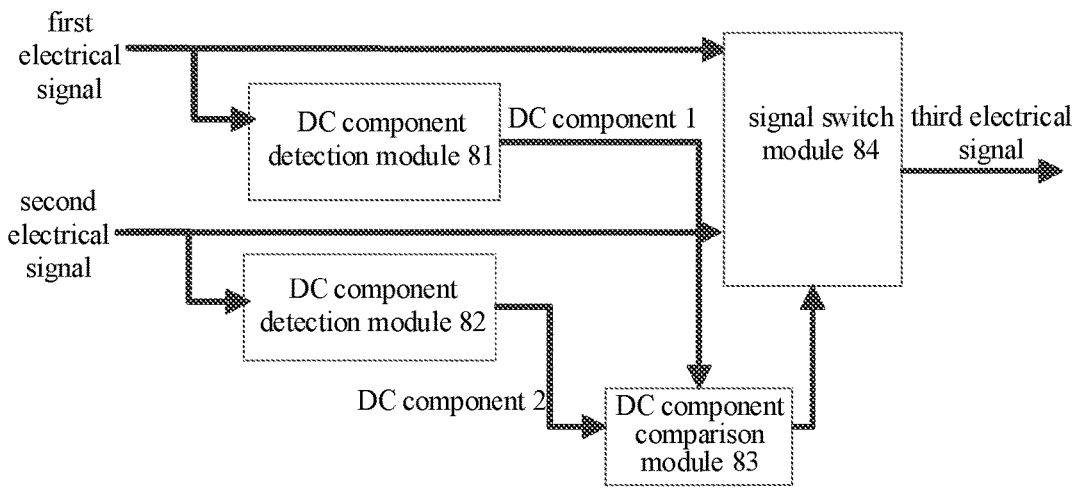
FIG. 8 is a schematic structural diagram of a signal comparison module, in Example Two, which compares magnitudes of direct-current (DC) components of signals for realizing a signal comparison according to an embodiment of the present disclosure.

FIG. 8 is a schematic structural diagram of the signal comparison module 75 in this example in a case where the signal comparison module 75 is configured to compare magnitudes of DC components of signals for realizing a signal comparison. As shown in FIG. 8, the signal comparison module 75 includes: a DC component detection module 81, a DC component detection module 82, a DC component comparison module 83, and a signal switch module 84. The DC component detection module 81 and the DC component detection module 82 detect a DC component 1 of the first electrical signal and a DC component 2 of the second electrical signal respectively, and input the DC component 1 and the DC component 2 into the DC component comparison module 83. The DC component comparison module 83 compares magnitudes of the two input DC components to obtain a comparison result, and controls the signal switch module 84 according to the comparison result. In a case where the DC component 1 is greater than the DC component 2, the DC component comparison module 83 controls the signal switch module 84 to allow the first electrical signal (that is, the first electrical signal is taken as the third electrical signal output by the signal switch module 84) to pass through; In a case where the DC component 1 is less than the DC component 2, the DC component comparison module 83 controls the signal switch module 84 to allow the second electrical signal (that is, the second electrical signal is taken as the third electrical signal output by the signal switch module 84) to pass through; and in a case where the DC component 1 is equal to the DC component 2, the DC component comparison module 83 controls the signal switch module 84 to allow the second electrical signal to pass through, and the DC component comparison module 83 may be kept unchanged in a current state or may allow the second electrical signal to pass through.

Figure 9:
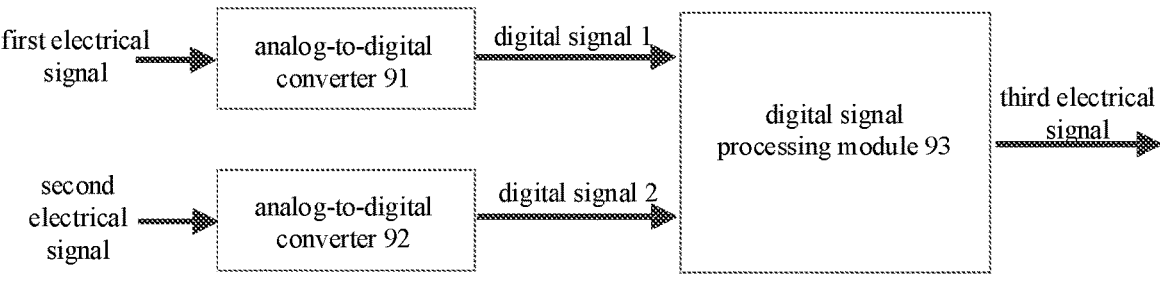
FIG. 9 is a schematic structural diagram of a signal comparison module, in Example Two, which compares magnitudes of peak-to-peak values of a first electrical signal and a second electrical signal for realizing a signal comparison according to an embodiment of the present disclosure.

FIG. 9 is a schematic structural diagram of the signal comparison module 75 in this example in a case where the signal comparison module 75 is configured to compare magnitudes of peak-to-peak values of the first electrical signal and the second electrical signal for realizing a signal comparison. As shown in FIG. 9, the signal comparison module 75 includes: an analog-to-digital converter 91, an analog-to-digital converter 92, and a digital signal process-ing module 93. The analog-to-digital converter 91 samples the first electrical signal, converts the sampled first electrical signal into a digital signal 1, and inputs the digital signal 1 into the digital signal processing module 93; and the analog-to-digital converter 92 samples the second electrical signal, converts the sampled second electrical signal into a digital signal 2, and inputs the digital signal 2 into the digital signal processing module 93. The digital signal processing module 93 may include at least one of a DC blocking module with respect to the digital signal 1 and the digital signal 2, a clock recovery module or a peak-to-peak-value comparison mod-ule. The digital signal processing module 93 further includes a signal switch module configured to output one of the digital signal 1 and the digital signal 2 as the third electrical signal to the subsequent signal processing module according to the signal quality.

In a case where an uplink optical signal at the speed of about 50 G is input, the optical signal at the speed of about 50 G is converted into the first electrical signal through the first optical path of the OLT multi-speed receiving appara-tus, and the first electrical signal is input into the analog-to-digital converter 91, in this case, the second optical path is cut off, no differential signal of the second optical signal is output, and no signal is output after the digital signal 2 output by the analog-to-digital converter 92 is processed by the DC blocking module. Therefore, the digital signal pro-cessing module 93 selects the digital signal 1 as the third electrical signal to output it. In a case where an uplink optical signal at the speed of about 12.5 G/25 G is input and a wavelength of the optical signal at the speed of about 12.5 G/25 G is in a cut-off wavelength range of the first optical path and a passband wavelength range of the second optical path, the optical signal at the speed of about 12.5 G/25 G is cut off in the first optical path of the OLT multi-speed receiving apparatus, the digital signal 1 output by the digital-to-analog converter 91 is a DC noise signal, and no signal is output after the digital signal 1 output by the digital-to-analog converter 91 is processed by the DC block-ing module. The analog-to-digital converter 92 in the second optical path outputs a normal differential signal. Therefore, the digital signal processing module 93 selects the digital signal 2 as the third electrical signal to output it. In a case where an uplink optical signal at the speed of about 12.5 G/25 G is input and a wavelength of the optical signal at the speed of about 12.5 G/25 G is in a wavelength range of the transition band of the first optical path and the second optical path, the optical signal at the speed of about 12.5 G/25 G is output through the first optical path and the second optical path of the OLT multi-speed receiving apparatus, the analog-to-digital converter 91 and the analog-to-digital converter 92 output the digital signal 1 and the digital signal 2 respec-tively, therefore the digital signal processing module 93 may compare magnitudes of peak-to-peak values of levels of the digital signal 1 and the digital signal 2 to select one of the digital signal 1 and the digital signal 2 that has the greater peak-to-peak value to output it. In a case where an uplink optical signal at the speed of about 12.5 G/25 G is input and a wavelength of the optical signal at the speed of about 12.5 G/25 G is in a passband wavelength range of the first optical path, the optical signal at the speed of about 12.5 G/25 G is output through the first optical path of the OLT multi-speed receiving apparatus, the analog-to-digital converter 91 in the first optical path outputs a normal differential signal, and no signal is output after the digital signal 2 output by the analog-to-digital converter 92 is processed by the DC block-ing module. Therefore, the digital signal processing module 93 selects the digital signal 1 as the third electrical signal to output it. In some implementations, the digital signal pro-cessing module 93 may further include a digital equalization module, which is configured to recover the quality of an input electrical signal, detect signal-to-noise ratios of the digital signal 1 and the digital signal 2 simultaneously, and select one of the digital signal 1 and the digital signal 2 that has the greater signal-to-noise ratio as the third electrical signal to output it. In some implementations, the digital signal processing module further includes a frequency detec-tion module configured to identify a speed level of the first electrical signal.

FIG. 10 is a schematic structural diagram of the signal comparison module 75 in this example in a case where the signal comparison module 75 is configured to detect a magnitude of a frequency of the first electrical signal for realizing a signal comparison. As shown in FIG. 10, the signal comparison module 75 includes a frequency detection module 101, a comparison control module 102, and a signal switch module 103. The frequency detection module 101 detects a magnitude of a frequency of the first electrical signal, and performs low-pass filtering on an electrical signal at the speed of about 25 G or at a lower speed. The comparison control module 102 compares a magnitude of the first electrical signal subjected to the low-pass filtering with a magnitude of the second electrical signal, and sends a switch indication signal to the signal switch module 103. In a case where an uplink optical signal at the speed of about 50 G is input, if the frequency detection module 101 detects that the frequency of the first electrical signal is greater than 25 GHz, and the comparison control module 102 controls the signal switch module 103 to allow the first electrical signal to pass through; in a case where an uplink optical signal at the speed of about 25 G/12.5 G is input, if the frequency detection module 101 detects that the frequency of the first electrical signal is less than or equal to 25 GHz, the comparison control module 102 compares the magnitude of the first electrical signal subjected to the low-pass filtering with the magnitude of the second electrical signal, if the magnitude of the first electrical signal subjected to the low-pass filtering is greater than the magnitude of the second electrical signal, the signal switch module 103 allows the first electrical signal to pass through, and if the magnitude of the first electrical signal subjected to the low-pass filtering is less than the magnitude of the second electrical signal, the signal switch module 103 allows the second electrical signal to pass through. In addition, the frequency detection module 101 includes: a DC blocking submodule configured to perform DC blocking processing on the first electrical signal; and correspondingly, the frequency detection module 101 is configured to detect the magnitude of the frequency of the first electrical signal subjected to the DC blocking processing.

Compared with the Example One, the electrical signal output in the Example Two is an electrical signal in one path. Correspondingly, the signal receiving end is to be provided with merely one pair of receiving pins, so that the hardware cost and the cost of the device are greatly reduced. In order to facilitate subsequent processing on the received electrical signal by the signal receiving end, in this example, the signal receiving end is informed of a speed level of the signal. Correspondingly, the OLT multi-speed receiving apparatus in this example further includes a signal-speed-level indi-cation interface, which may identify a speed level of the effective electrical signal and sends a speed level indication signal of the effective electrical signal to the OLT device during a selection being carried out between the first signal and the second signal. The signal-speed-level indication interface is an implementation of the signal-speed-level indication module mentioned above.

FIG. 11 is a schematic structural diagram of the multi-speed receiving system provided in the Example Two. The multi-speed receiving system includes: a multi-speed receiving apparatus 119 (i.e., the multi-speed receiving apparatus shown in FIG. 7), a plurality of ONUs 111, an optical splitter 112, and a signal receiving end 118. The multi-speed receiving system differs from the multi-speed receiving system provided in the Example One in that: the multi-speed receiving apparatus 119 of the multi-speed receiving system in the Example Two further includes a signal comparison module 116 (i.e. the signal comparison module 75 shown in FIG. 7) in addition to the optical amplifier 113, the filter 114, the first detector 115, and the second detector 117. Accordingly, the signal receiving end 118 of the system in the Example Two is to be provided with merely one pair of receiving pins. Moreover, the signal comparison module 116 of the system in the Example Two can send the speed level indication signal described above.

Example Three

A multi-speed receiving apparatus is provided in this example. FIG. 12 is a schematic structural diagram of the multi-speed receiving apparatus in this example. The multi-speed receiving apparatus in the Example Three differs from the multi-speed receiving apparatus in the Example Two in that: the signal comparison module 75 is replaced with a signal addition module 125. Correspondingly, the multi-speed receiving apparatus in the Example Three includes: an optical amplifier 121, a filter 122, a first detector 123, a second detector 124, and the signal summing module 125.

The signal addition module 125 adds the first electrical signal to the second electrical signal to obtain a fourth electrical signal (corresponding to the third electrical signal in the Example Two) and outputs the fourth electrical signal. The signal addition module 125 may include a DC blocking and noise reducing module and a signal adder module, and the DC blocking and noise reducing module is configured to perform DC component isolation and noise reduction on the first electrical signal and the second electrical signal respectively. The signal adder module is configured to combine the two electrical signals subjected to the DC component isolation and the noise reduction and output the combined electrical signal as the fourth electrical signal.

Figure 13:
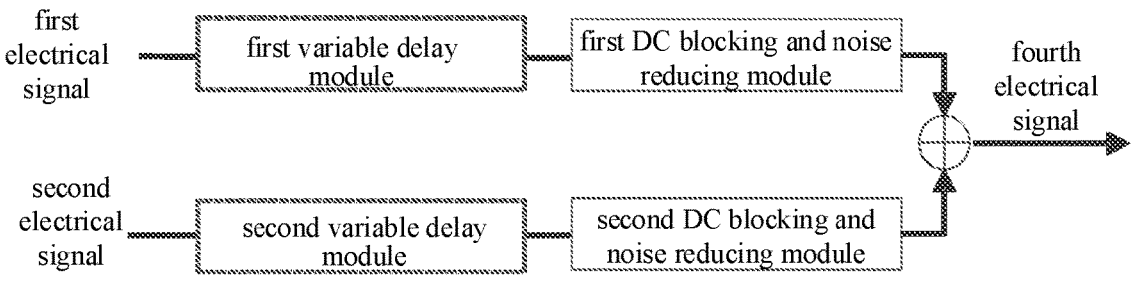
FIG. 13 is a schematic structural diagram of a signal addition module including a variable delay module in Example Three according to an embodiment of the present disclosure.

In some implementations, the signal addition module further includes a variable delay module, which performs signal variable delaying on the first electrical signal or the second electrical signal, so as to ensure that delays of such two signals are equal to each other in a case where a wavelength of an uplink signal is in the transition band of the filter, thereby preventing a signal jitter from occurring. FIG. 13 is a schematic structural diagram of the signal addition module including the variable delay module in this example.

In this example, in a case where an uplink signal is at the speed of about 25 G and a temperature-controlled wavelength is to be controlled in the narrowband wavelength range by a TEC controller, the first optical path, the first detector, and the first electrical signal in this example are applicable to the uplink signal at the speed of about 25 G. Therefore, the second optical path mainly allows the signal at the speed level of about 12.5 G to pass through. In this example, the signal at the speed of about 50 G is accordingly changed to the signal at the speed of about 50 G/25 G, and the signal at the speed of about 12.5 G/25 G is accordingly changed to the signal at the speed of about 12.5 G. Therefore, the multi-speed receiving apparatus can be flexibly applied to various scenarios of transmitters for different speed levels and different wavelength ranges.

The structure of the multi-speed receiving system in the Example Three is similar to that shown in FIG. 11, and merely differs from that shown in FIG. 11 in that: the signal comparison module 116 in FIG. 11 is replaced with the signal addition module 125.

Example Four

Figure 14:
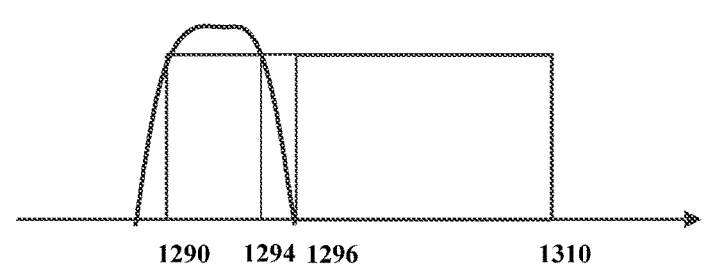
FIG. 14 is a schematic diagram illustrating a wavelength division manner in Example Four according to an embodiment of the present disclosure.

A main difference between the Example Four and the three examples including the Example one, the Example Two and the Example Three lies in that a different wavelength division manner is adopted. The wavelength division manner in the Example One, the Example Two, and the Example Three may be referred to FIG. 4. As can be seen from FIG. 4, in the Example One, the Example Two, and the Example Three, in a case where the uplink low-speed-level optical signal is transmitted by the transmitter equipped with the uncooled laser, the wavelength of the uplink low-speed-level optical signal may fall in the transition bands of the filter, so that both the first detector and the second detector may output the electrical signals, and therefore, one of the output electrical signals that has the higher quality is to be selected to be output, which produces the result that the signal preprocessing module is relatively complex. In some implementations, the existing uplink wavelength range of the 50 G PON is divided into two sub-channels, including a narrowband sub-channel and a wideband sub-channel, the wavelengths of such two sub-channels are not overlapped, and a certain spacing transition band is provided between the two sub-channels; thus, it is ensured that a wideband uncooled laser can be adopted for the optical signal at the speed of about 12.5 G/25 G, and a narrowband laser and an SOA receiver are adopted for the optical signal of about 50 G/25 G. Taking a wavelength option from 1290 nm to 1310 nm as an example, the wavelength range from 1290 nm to 1310 nm may be divided as follows: the narrowband sub-channel is from 1290 nm to 1294 nm, the wideband sub-channel is from 1296 nm to 1310 nm, and a transition isolation band between such two sub-channels is from 1294 nm to 1296 nm. FIG. 14 is a schematic diagram illustrating the wavelength division manner in the Example Four. Thus, in the Example Four, the first wavelength range and the second wavelength range are not overlapped, and a spacing transition band is provided therebetween.

After the wavelength division manner mentioned above is adopted, the filter in the OLT multi-speed receiving apparatus has the following characteristics: for the first optical path, the wavelengths of the narrowband sub-channel (corresponding to the first wavelength range) belong to a passband, and the wavelengths of the wideband sub-channel (corresponding to the second wavelength range) are cut off; for the second optical path, the wavelengths of the wideband sub-channel belong to a passband, and the wavelengths of the narrowband sub-channel are cut off; and the transition isolation band between the two sub-channels is a transition band of the filter, and both the first optical path and the second optical path output optical signals. By adopting the above wavelength division manner, the uplink signals at different speed levels are input to fixed detectors and converted into electrical signals to be output. For example, In a case where an uplink optical signal at the speed of about 50 G is applied to the narrowband sub-channel and an uplink optical signal at the speed of about 12.5 G/25 G is applied to the wideband sub-channel, the uplink optical signal at the speed of about 50 G is output by the first detector through the first optical path; and the uplink optical signal at the speed of about 12.5 G/25 G is output by the second detector through the second optical path.

In this example, in a case where the multi-speed receiving apparatus is applied to a 50 G PON system, the uplink optical signals at different speed levels are respectively corresponding to different detectors, but do not simultaneously appear in any detector; and accordingly, the signal selection module mentioned above may be not to be provided. That is, the signal selection module is not desired to be provided in a 50 G PON MAC chip. In a case where the signal selection module is omitted, the uplink signals at different speed levels may be selected, according to the reading of DBA scheduling information, to be input into the MAC protocol processing module. In this example, the first detector and the second detector may select a detector and a TIA device which have appropriate bandwidths according to a speed level of a signal, so that adopting a high-speed device for a low-speed-level optical signal can be obviated, thereby facilitating reduction of cost and noise.

In other alternative implementations of this example, if the number of receiving pins of the OLT multi-speed receiving apparatus is to be reduced, the OLT multi-speed receiving apparatus may include the signal selection module. A selection state of the signal selection module may be controlled by sending a speed indication signal through OLT PON MAC. Correspondingly, the signal selection module is configured to receive the speed indication signal from the OLT PON MAC, and determine which one of the two electrical signals is to be selected to be output according to a signal type of the speed indication signal. The selection state of the signal selection module may also be controlled through a comparison between magnitudes of RSSI signals of the first detector and the second detector. Correspondingly, the multi-speed receiving apparatus may include an RSSI comparison module respectively connected to the first detector, the second detector, and the signal selection module, and configured to detect an RSSI value of the first electrical signal from the first detector and an RSSI value of the second electrical signal from the second detector to obtain a detection result, and control the signal selection module to select one of the two electrical signals as an output signal according to the detection result. In some implementations, the signal selection module may perform a determination according to frequencies of the received optical signals, so as to allow the high-frequency electrical signal to pass through, and in this case, no external control signal is desired.

Example Five

Figure 15:
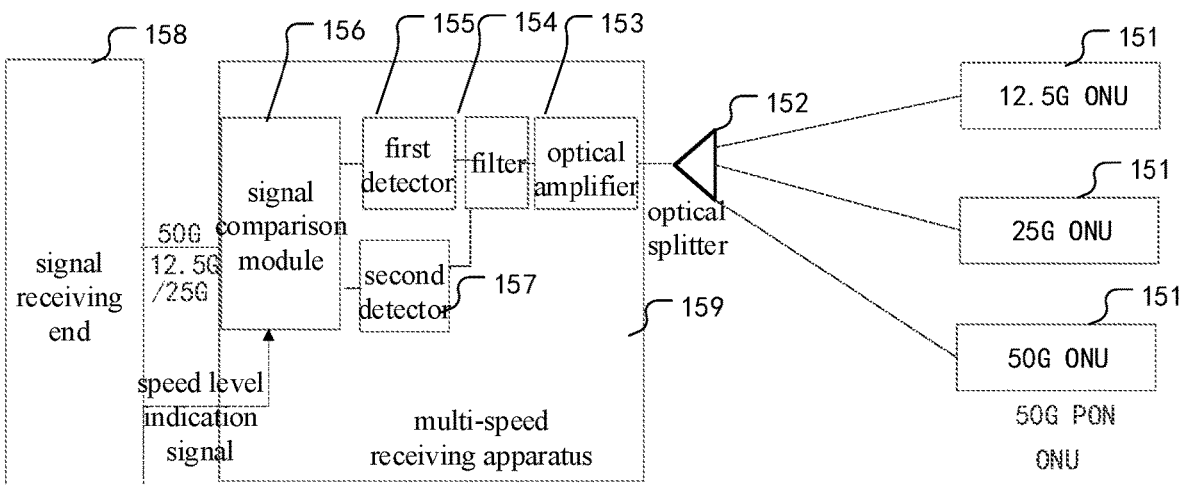
FIG. 15 is a schematic structural diagram of a multi-speed receiving system in Example Five according to an embodiment of the present disclosure.

The multi-speed receiving system provided in the Example Five is similar to the multi-speed receiving system provided in the Example Two as shown in FIG. 11. FIG. 15 is a schematic structural diagram of the multi-speed receiving system provided in the Example Five. As shown in FIG. 15, the multi-speed receiving system includes: a multi-speed receiving apparatus 159 the same as that in the Example Two (i.e., the multi-speed receiving apparatus shown in FIG. 7), a plurality of ONUs 151, an optical splitter 152, and a signal receiving end 158. Similar to the multi-speed receiving system provided in the Example Two (i.e., the multi-speed receiving system shown in FIG. 11), the multi-speed receiving apparatus 159 of the system provided in the Example Five includes a signal comparison module 156 in addition to an optical amplifier 153, a filter 154, a first detector 155, and a second detector 157. Accordingly, the signal receiving end 158 in the system is to be provided with merely one pair of receiving pins.

The system shown in FIG. 15 differs from that shown in FIG. 11 mainly in that: the signal-speed-level indication interface in FIG. 15 is reversed compared to the signal-speed-level indication interface in FIG. 11. The term "reversed" refers to that an input/output direction (i.e., a signal flow direction) of the signal-speed-level indication interface in FIG. 15 is opposite/contrary to an input/output direction (i.e., a signal flow direction) of the signal-speed-level indication interface in FIG. 11. In the system shown in FIG. 11, the speed level indication signal is sent out by the signal comparison module 116 and received by the signal receiving end 118 (i.e., the optical line terminal). In the system shown in FIG. 15, the speed level indication signal is sent out by the signal receiving end 158 (i.e., the optical line terminal) and received by the signal comparison module 156. The OLT determines a speed of a signal corresponding to a current scheduled time slot according to a corresponding relationship, between scheduled time slots and signal speeds, which is stored in a time slot scheduling table, and sends the speed level indication signal to the multi-speed receiving apparatus 159, and the signal comparison module 156 in the multi-speed receiving apparatus 159 switches between the first electrical signal and the second electrical signal according to the current speed level indication signal and a quality comparison result between the signals to output one of the first electrical signal and the second electrical signal as the third electrical signal. For example, if the OLT sends a high-speed-level indication signal, the signal comparison module 156 controls the first electrical signal to be directly output; and if the OLT sends a low-speed-level indication signal, the signal comparison module 156 compares the quality of the first electrical signal with the quality of the second electrical signal, and selects one of the first electrical signal and the second electrical signal that has the higher signal quality as the third electrical signal to output it.

An embodiment of the present disclosure further provides an optical signal receiving method, including operation one and operation two.

In the operation one, noise in optical signals amplified by an amplifier is filtered out by a filter, and wavelength division processing is performed on the optical signals by the filter to obtain at least one optical signal corresponding to a preset wavelength range.

This operation is performed by the filter. Accordingly, the at least one optical signal corresponding to the preset wavelength range includes: a first optical signal corresponding to a first wavelength range and/or a second optical signal corresponding to a second wavelength range.

In the operation two, the at least one optical signal is converted into an electrical signal by at least one detector.

The number of detectors may be one or more. For example, the detectors include: a first detector and a second detector; and the first detector is configured to convert the first optical signal into a first electrical signal, and the second detector is configured to convert the second optical signal into a second electrical signal.

Details of implementations of the above operations may be referred to the description of the corresponding components in the above optical signal receiving apparatus, and thus will not be described in detail here.

An embodiment of the present disclosure further provides a computer-readable storage medium having stored therein a computer program, the computer program, executed by a processor, causes the processor to implement the optical signal receiving method described above.

In summary, by adopting the technical solutions described in the above examples, in the 50 G PON system, the uncooled laser can be adopted for the uplink optical signals at the speed level of about 25 G/12.5 G, and the uplink optical signals at the speed level of about 25 G/12.5 G may operate at any wavelength within the uplink wavelength range. In a case where a low-speed wavelength falls in the narrowband wavelength range, the optical signal is converted into the electrical signal to be output by the first detector through the first optical path; in a case where the low-speed wavelength goes beyond the narrowband wavelength range, the optical signal is converted into the electrical signal to be output by the second detector through the second optical path; in a case where the low-speed wavelength falls in the transition band between the passband range and the cut-off band range of the filter, the optical signal is divided to be output in two paths, so that the optical signal output in one path is converted into the first electrical signal to be output by the first detector through the first optical path, and the optical signal output in the other path is converted into the second electrical signal to be output by the second detector through the second optical path. With the above technical solutions, the optical signals at multiple speed levels can be compatibly supported, and the two electrical signals can be converted into one electrical signal by the signal preprocessing module, so that the signal receiving end is to be provided with merely one pair of receiving pins, thereby greatly reducing the cost of the receiving end, reducing the size of the receiving end, and facilitating the miniaturization packaging of the device.

In addition, it should be noted that the multi-speed receiving apparatus in each of the above examples is the optical signal receiving apparatus, and the multi-speed receiving system in each of the above examples is the optical signal receiving system. Furthermore, the multi-speed receiving apparatus in the optical signal receiving system may be flexibly replaced with any one of the above-described structures, which is not limited in the present disclosure. In addition, the above examples may be combined with each other. For example, the structures of the devices in each example can be applied to both wavelength division manners illustrated by FIG. 4 and FIG. 14 just after the characteristics of the filters are adjusted accordingly.

It should be understood by those of ordinary skill in the art that the functional modules/units in all or some of the operations, the systems, and the devices in the methods disclosed above may be implemented as software, firmware, hardware, or suitable combinations thereof. If implemented as hardware, the dividing between the functional modules/units stated above is not necessarily corresponding to the dividing of physical components; for example, one physical component may have a plurality of functions, or one function or operation may be performed through cooperation of several physical components. Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/ nonvolatile and removable/non-removable medium used in any method or technology for storing information (such as computer-readable instructions, data structures, program modules and other data). The computer storage medium includes, but is not limited to, an RAM, an ROM, an EEPROM, a FLASH or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication medium generally includes computer-readable instructions, data structures, program modules, or other data in modulated data signals such as carrier wave or other transmission mechanism, and may include any information delivery medium.

The present disclosure discloses the exemplary embodiments described in detail, but the exemplary embodiments are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details may be made without departing from the scope of the present disclosure as claimed by the appended claims.

What is claimed is:

1. An optical signal receiving apparatus, comprising: a filter and at least one detector; wherein the filter is disposed following an amplifier, filter characteristics of the filter are configured according to a preset wavelength range, and the filter is configured to filter out noise in optical signals amplified by the amplifier and perform wavelength division processing on the optical signals to obtain at least one optical signal corresponding to the preset wavelength range; and the at least one detector is configured to convert the at least one optical signal into an electrical signal, wherein the at least one detector comprises a first detector and a second detector, the at least one optical signal corresponding to the preset wavelength range comprises at least one of a first optical signal corresponding to a first wavelength range or a second optical signal corresponding to a second wavelength range, and the first detector is configured to convert the first optical signal into a first electrical signal, and the second detector is configured to convert the second optical signal into a second electrical signal, wherein the filter is provided with a first output optical path and a second output optical path, a passband range of the first output optical path is corresponding to the first wavelength range, and a passband range of the second output optical path of the filter is corresponding to the second wavelength range, the filter is configured to perform transmission processing or reflection processing on the first optical signal corresponding to the first wavelength range and then transmit the first optical signal to the first detector through the first output optical path, and perform reflection processing or transmission processing on the second optical signal corresponding to the second wavelength range and then transmit the second optical signal to the second detector through the second output optical path, wherein a division of the first wavelength range and the second wavelength range is carried out according to a corresponding relationship between speeds and wavelengths of optical signals, the first wavelength range is corresponding to an original optical signal at a first speed, and the second wavelength range is corresponding to an original optical signal at a second speed.

2. The apparatus of claim 1, further comprising:
the amplifier configured to amplify received original optical signals and transmit the amplified optical signals to the filter.

3. The apparatus of claim 1, wherein the corresponding relationship between the speeds and the wavelengths of the optical signals is determined according to parameters of a laser of an optical signal transmitting end; wherein the first speed is greater than the second speed, and the first wavelength range is less than the second wavelength range;

wherein the first wavelength range is in a middle region of the second wavelength range; or the first wavelength range and the second wavelength range are not overlapped, and a spacing transition band is provided between the first wavelength range and the second wavelength range; wherein the first speed comprises: 50 gigabits per second (Gbit/s), and the second speed comprises: at least one of 12.5 Gbit/s or 25 Gbit/s; or the first speed comprises: 50 Gbit/s and 25 Gbit/s, and the second speed comprises 12.5 Gbit/s.

4. The apparatus of claim 1, comprising:
a signal preprocessing module configured to preprocess a first electrical signal output by a first detector and a second electrical signal output by a second detector to obtain a third electrical signal subjected to preprocessing, and output the third electrical signal to a signal receiving end.

5. The apparatus of claim 4, wherein the signal preprocessing module comprises: a signal comparison module or a signal addition module;

wherein the signal comparison module is configured to compare the first electrical signal with the second electrical signal in terms of at least one of a direct current (DC) component, a peak-to-peak value, a signal-to-noise ratio, or a frequency to obtain a comparison result, and take the first electrical signal or the second electrical signal as the third electrical signal according to the comparison result; and
the signal addition module is configured to add the first electrical signal to the second electrical signal to obtain the third electrical signal.

6. The apparatus of claim 4, wherein the signal receiving end is provided with a pair of receiving pins configured to receive the third electrical signal; and
the optical signal receiving apparatus further comprises:
a signal-speed-level indication module configured to determine a speed level of the third electrical signal according to a wavelength and a speed of the third electrical signal, and send a speed level indication signal to the signal receiving end.

7. The apparatus of claim 1, wherein the optical signals are uplink optical signals transmitted from an optical network unit to an optical line terminal.

8. An optical line terminal, comprising: the optical signal receiving apparatus of claim 1.

9. The optical line terminal of claim 8, further comprising:
a signal selection module configured to determine a speed level of a signal corresponding to a current scheduled time slot according to a corresponding relationship, between scheduled time slots and speeds of signals, stored in a time slot scheduling table, and select, according to the speed level of the signal, a first electrical signal or a second electrical signal as an effective electrical signal to be received.

10. The optical line terminal of claim 9, wherein the signal selection module is configured to respectively determine a bit error rate of the first electrical signal in a physical layer and a bit error rate of the second electrical signal in the physical layer, and receive one of the first electrical signal and the second electrical signal that has a lower bit error rate as the effective electrical signal.

11. An optical signal receiving system, comprising: the optical line terminal of claim 8, and an optical network unit.

12. An optical signal receiving method, comprising:
filtering out, by a filter, noise in optical signals amplified by an amplifier, and performing, by the filter, wavelength division processing on the optical signals to obtain at least one optical signal corresponding to a preset wavelength range; and
converting the at least one optical signal into an electrical signal by at least one detector,
wherein the at least one detector comprises a first detector and a second detector,
the at least one optical signal corresponding to the preset wavelength range comprises at least one of a first optical signal corresponding to a first wavelength range or a second optical signal corresponding to a second wavelength range,
the first detector is configured to convert the first optical signal into a first electrical signal, and the second detector is configured to convert the second optical signal into a second electrical signal,
wherein the filter is provided with a first output optical path and a second output optical path, a passband range of the first output optical path is corresponding to the first wavelength range, and a passband range of the second output optical path of the filter is corresponding to the second wavelength range,
the filter is configured to perform transmission processing or reflection processing on the first optical signal corresponding to the first wavelength range and then transmit the first optical signal to the first detector through the first output optical path, and perform reflection processing or transmission processing on the second optical signal corresponding to the second wavelength range and then transmit the second optical signal to the second detector through the second output optical path,
wherein a division of the first wavelength range and the second wavelength range is carried out according to a corresponding relationship between speeds and wavelengths of optical signals, the first wavelength range is corresponding to an original optical signal at a first speed, and the second wavelength range is corresponding to an original optical signal at a second speed.

13. A computer-readable storage medium having stored therein a computer program, the computer program, executed by a processor, causes the processor to implement the optical signal receiving method of claim 12.

14. The apparatus of claim 2, comprising:
a signal preprocessing module configured to preprocess a first electrical signal output by a first detector and a second electrical signal output by a second detector to obtain a third electrical signal subjected to preprocessing, and output the third electrical signal.

15. An optical line terminal, comprising an optical signal receiving apparatus, the optical signal receiving apparatus comprising: a filter and at least one detector, wherein the filter is disposed following an amplifier, filter characteristics of the filter are configured according to a preset wavelength range, and the filter is configured to filter out noise in optical signals amplified by the amplifier and perform wavelength division processing on the optical signals to obtain at least one optical signal corresponding to the preset wavelength range, and the at least one detector is configured to convert the at least one optical signal into an electrical signal, the optical line terminal further comprises:

a signal selection module configured to determine a speed level of a signal corresponding to a current scheduled time slot according to a corresponding relationship, between scheduled time slots and speeds of signals, stored in a time slot scheduling table, and select, according to the speed level of the signal, a first electrical signal or a second electrical signal as an effective electrical signal to be received.

* * * * *